(12) United States Patent
Li et al.

(10) Patent No.: US 9,572,153 B2
(45) Date of Patent: Feb. 14, 2017

(54) INFORMATION TRANSMISSION METHOD, USER EQUIPMENT, AND BASE STATION

(71) Applicant: Huawei Technologies Co., Ltd., Shenzhen, Guangdong (CN)

(72) Inventors: Bo Li, Beijing (CN); Lei Guan, Beijing (CN); Xiaoan Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 14/702,453

(22) Filed: May 1, 2015

(65) Prior Publication Data

US 2015/0237626 A1    Aug. 20, 2015

Related U.S. Application Data

(63) Continuation of application No. PCT/CN2012/084020, filed on Nov. 2, 2012.

(51) Int. Cl.
*H04W 72/04* (2009.01)
*H04L 5/14* (2006.01)
(Continued)

(52) U.S. Cl.
CPC ........ *H04W 72/0446* (2013.01); *H04L 5/1469* (2013.01); *H04L 5/16* (2013.01); *H04W 72/1284* (2013.01); *H04W 72/1289* (2013.01)

(58) Field of Classification Search
CPC ............. H04W 72/04; H04W 72/0446; H04W 72/1284; H04W 72/1289; H04L 5/12; H04L 5/14; H04L 5/16; H04L 5/1469
(Continued)

(56) References Cited

U.S. PATENT DOCUMENTS 9,019,903 B2 * 4/2015 Palanki ............... H04J 11/0053
370/329
2011/0013542 A1    1/2011 Yu et al.
(Continued)

FOREIGN PATENT DOCUMENTS

CN    1965513 A    5/2007
CN    101309523 A    11/2008
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 205 pages.
(Continued)

*Primary Examiner* — Afsar M Qureshi

(57) ABSTRACT

Embodiments of the present invention provide an information transmission method, including: determining, by a user equipment (UE), a first subframe; configuring the UE to send a first uplink signal in the first subframe; determining, by the UE, that the first uplink signal is a first type of uplink signal, where the first type of uplink signal occupies a first part of symbols of the first subframe, and the number of symbols included in the first part of symbols is less than the number of symbols included in the first subframe; and detecting, by the UE, a downlink control channel on a second part of symbols in the first subframe, where the first part of symbols and the second part of symbols do not overlap in time domain.

28 Claims, 4 Drawing Sheets

(51) Int. Cl.
*H04L 5/16* (2006.01)
*H04W 72/12* (2009.01)

(58) Field of Classification Search
USPC .......................................... 370/280, 315, 336
See application file for complete search history.

(56) References Cited

U.S. PATENT DOCUMENTS

| | | | |
|---|---|---|---|
| 2011/0103272 A1 | 5/2011 | Dai et al. | |
| 2011/0310789 A1 | 12/2011 | Hu et al. | |
| 2012/0082085 A1* | 4/2012 | Horiuchi | H04B 7/15542 370/315 |
| 2012/0147794 A1* | 6/2012 | Chung | H04W 72/0406 370/280 |
| 2012/0184206 A1* | 7/2012 | Kim | H04L 5/0091 455/9 |
| 2012/0269161 A1 | 10/2012 | Chin et al. | |
| 2012/0275400 A1 | 11/2012 | Chen et al. | |
| 2013/0170426 A1* | 7/2013 | Ukita | H04W 52/0216 370/312 |
| 2013/0301486 A1 | 11/2013 | Kishiyama | |
| 2014/0023012 A1 | 1/2014 | Sato | |
| 2014/0162642 A1* | 6/2014 | Kwon | H04W 76/021 455/435.1 |
| 2014/0247805 A1 | 9/2014 | Li et al. | |

FOREIGN PATENT DOCUMENTS

| | | |
|---|---|---|
| CN | 101431362 A | 5/2009 |
| CN | 102150382 A | 8/2011 |
| JP | 2012-175258 | 9/2012 |
| JP | 2012-209616 | 10/2012 |
| RU | 2010136370 A | 3/2012 |
| WO | WO 2012/111805 A1 | 8/2012 |

OTHER PUBLICATIONS

"RE mapping for ePDCCH", Panasonic, 3GPP TSG RAN WG1 Meeting #70, Aug. 13-17, 2012, 8 pages, R1-123287.
"Views on inter-band CA with different TDD configurations on different bands", Nokia Siemens Networks, 3GPP TSG-RAN WG2 Meeting #75, Aug. 22-26, 2011, 4 pages.
"Half duplex operations for TDD inter-band CA", CATT, 3GPP TSG RAN WG1 Meeting #70bis, Oct. 8-12, 2012, 3 pages.
"Remaining issues on half-duplex based CA with different TDD UL-DL configurations", LG Electronics, 3GPP TSG RAN WG1 #70bis, Oct. 8-12, 2012, 4 pages.
"Remaining issues in cell-specific TDD configuration", Intel Corporation, 3GPP TSG-RAN2 Meeting #79, Aug. 13-17, 2012, 3 pages.
"3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 106 pages.

* cited by examiner

INFORMATION TRANSMISSION METHOD, USER EQUIPMENT, AND BASE STATION

CROSS-REFERENCE TO RELATED APPLICATIONS

This application is a continuation of International Application No. PCT/CN2012/084020, filed on Nov. 2, 2012, which is hereby incorporated by reference in its entirety.

TECHNICAL FIELD

The present invention relates to the communications field, and in particular, to information transmission in the radio communications field.

BACKGROUND

A duplex mode of a radio communications system includes time division duplex (TDD, Time Division Duplex) and frequency division duplex (FDD, Frequency Division Duplex). On one TDD carrier, a UE cannot receive and send information at the same time, which means that either uplink transmission or downlink transmission is allowed at a given point of time. FDD systems may also be classified into full-duplex FDD and half-duplex FDD, both of which have a pair of carriers, namely, one uplink carrier and one downlink carrier. In the full-duplex FDD, a UE can separately receive and send information on the pair of uplink and downlink carriers at the same time; however, in the half-duplex FDD, a UE can only use a carrier of one direction at a given point of time, which means that either the downlink carrier or the uplink carrier is used.

In a radio communications system, a carrier aggregation technology may be used to improve a peak rate of a user equipment (UE, User Equipment), to be specific, multiple carriers may be configured together for one UE to use. The multiple carriers may be multiple FDD carriers or multiple TDD carriers, and if the multiple carriers are multiple TDD carriers, uplink-downlink configurations on the multiple TDD carriers are the same.

A dynamic TDD carrier technology may be introduced into an evolved radio communications system in the future. Specifically, in the existing TDD carrier technology, both uplink and downlink subframes on a TDD carrier are configured by using broadcast signaling, and switch between uplink and downlink subframes is slow or even does not occur at all. However, in the dynamic TDD carrier technology, directions of some or all subframes on a dynamic TDD carrier may be dynamically determined by a base station according to a service requirement of a UE, that is, one subframe may be dynamically changed to an uplink subframe or a downlink subframe. Apparently, the UE still cannot receive or send information at the same time.

A carrier aggregation technology in which uplink-downlink configurations of carriers are different may also be introduced into an evolved radio communications system in the future. Specifically, for example, two TDD carriers may be configured for a UE, and TDD uplink-downlink configurations of the two TDD carriers are different. In another example, one FDD carrier and one TDD carrier may be aggregated, and uplink-downlink configurations of the two carriers are also different. In this case, a conflicted subframe exists in some subframes, that is to say, the conflicted subframe is an uplink subframe on one TDD carrier, and the conflicted subframe is a downlink subframe on another TDD carrier at the same time. Therefore, in the conflicted subframe, a UE that does not support simultaneous transmission and reception on two carriers, namely, a half-duplex UE, either sends information in the conflicted subframe on one carrier or receives information in the conflicted subframe on another carrier.

The foregoing problem in which a half-duplex UE cannot perform simultaneous reception and transmission may occur in scenarios of the foregoing dynamic TDD carrier and aggregation of carriers with different uplink-downlink configurations, and compromises resource utilization. The present invention is directed at solving a problem about how to improve resource utilization by a half-duplex UE in the foregoing scenarios.

SUMMARY

The present invention provides an information transmission method, including:
determining, by a user equipment UE, a first subframe;
configuring the UE to send a first uplink signal in the first subframe;
determining, by the UE, that the first uplink signal is a first type of uplink signal, where the first type of uplink signal occupies a first part of symbols of the first subframe, and the number of symbols included in the first part of symbols is less than the number of symbols included in the first subframe; and
detecting, by the UE, a downlink control channel on a second part of symbols in the first subframe, where the first part of symbols and the second part of symbols do not overlap in time domain.

The present invention further provides an information transmission method, including:
determining, by a base station, a first subframe;
configuring, by the base station, a UE to send a first uplink signal in the first subframe;
determining, by the base station, that the first uplink signal is a first type of uplink signal, where the first type of uplink signal occupies a first part of symbols of the first subframe, and the number of symbols included in the first part of symbols is less than the number of symbols included in the first subframe; and
sending, by the base station, a downlink control channel to the UE on a second part of symbols in the first subframe, where the first part of symbols and the second part of symbols do not overlap in time domain.

The present invention further provides a UE, including:
a determining module, configured to determine a first subframe for the UE;
a judging module, configured to determine that the first uplink signal is a first type of uplink signal for the UE, where the first type of uplink signal occupies a first part of symbols of the first subframe, and the number of symbols included in the first part of symbols is less than the number of symbols included in the first subframe; and
a detecting module, configured to detect a downlink control channel on a second part of symbols in the first subframe for the UE, where the first part of symbols and the second part of symbols do not overlap in time domain.

The present invention further provides a base station, including:
a determining module, configured to determine a first subframe for the base station;
a judging module, configured to determine that the first uplink signal is a first type of uplink signal for the base station, where the first type of uplink signal occupies a first part of symbols of the first subframe, and the number of symbols included in the first part of symbols is less than the number of symbols included in the first subframe; and a sending module, configured to send a downlink control channel to the UE on a second part of symbols in the first subframe for the base station, where the first part of symbols and the second part of symbols do not overlap in time domain.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
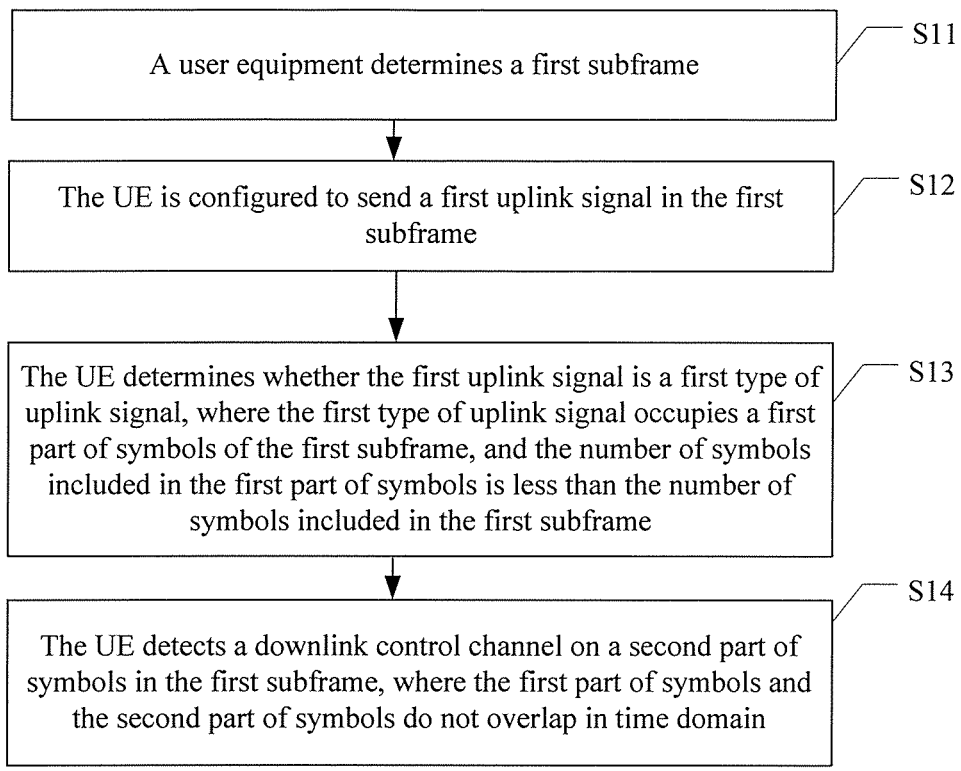
FIG. 1 is an information transmission method on a UE side according to an embodiment of the present invention.
Figure 2:
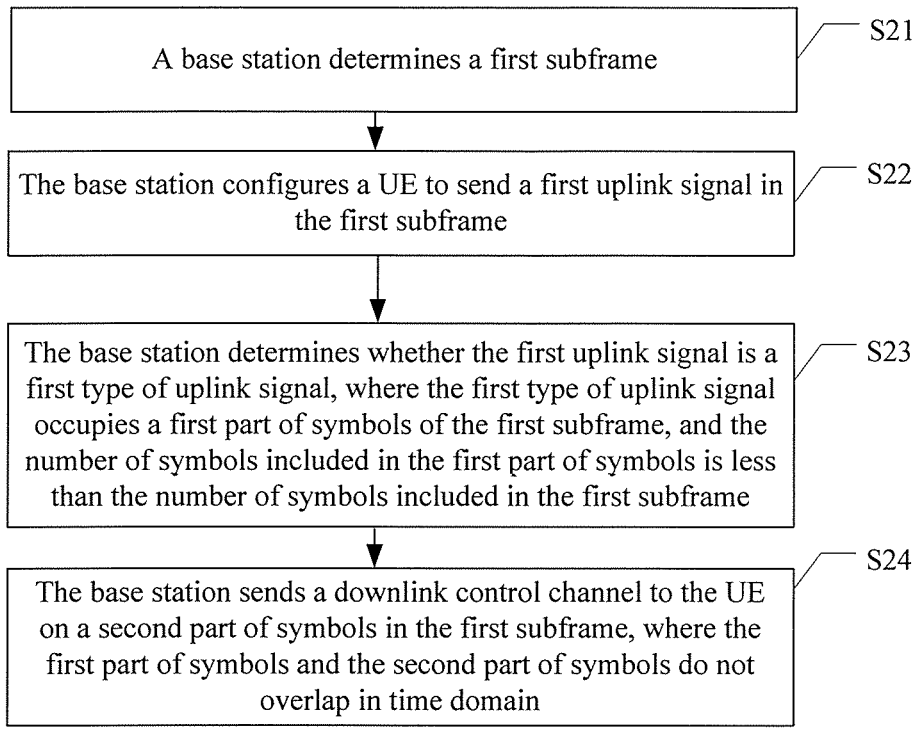
FIG. 2 is an information transmission method on a base station side according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The present invention provides an information transmission method, where the method may be used on a user equipment UE side, and includes:

Step 11: A UE determines a first subframe.

In an embodiment of the present invention, the first subframe may be a first subframe on a TDD carrier, and in this case, only the TDD carrier is configured by a base station for the UE; or the first subframe may be a respective first subframe on a first carrier and a second carrier, and in this case, the first carrier and the second carrier are configured by a base station for the UE. The first carrier and the second carrier may be two TDD carriers, or may be one TDD carrier and one FDD carrier. Specifically, directions of the first subframes on the first carrier and the second carrier may specifically be that: the first subframe on the first carrier is a downlink subframe and the first subframe on the second carrier is an uplink subframe, and vice versa. Since at least the first subframe has a different transmission direction when on the two different carriers, it can be seen that configurations of uplink and downlink subframes are different on the first carrier and the second carrier. Alternatively, a first subframe on at least one carrier among the first carrier and the second carrier is a TDD special subframe, where the special subframe includes three parts, namely, a downlink pilot timeslot, a guard period, and an uplink pilot timeslot.

Step 12: The UE is configured to send a first uplink signal in the first subframe.

The practice in which the UE is configured to send the first uplink signal on a first part of symbols in the first subframe may include the following options:

Optionally, the UE is configured by the base station by using an uplink scheduling grant sent by the base station at a point in time prior to the first subframe, to send an uplink data channel on the first part of symbols in the first subframe. Specifically, the first uplink signal is the uplink data channel, for example, a physical uplink shared channel PUSCH (Physical Uplink Shared Channel). A PUSCH sent in subframe n is configured or scheduled by using an uplink scheduling grant sent by the base station in subframe n-k prior to the subframe n, where k is a natural number greater than or equal to 4, and the uplink scheduling grant is one type of physical downlink control channels.

Optionally, the UE is configured by the base station by using a physical downlink control channel and/or downlink data channel sent by the base station at a point in time prior to the first subframe, to send uplink acknowledgement/negative acknowledgement ACK/NACK information on the first part of symbols in the first subframe. Specifically, the first uplink signal is the uplink ACK/NACK. Uplink ACK/NACK sent in subframe n is associated with a downlink data channel scheduled by the base station in subframe n-k prior to the subframe n, where k is a natural number greater than or equal to 4. The downlink data channel may be a physical downlink shared channel PDSCH (Physical Downlink Shared Channel), where the PDSCH is scheduled by a downlink scheduling assignment sent by the base station, and the downlink scheduling assignment is one type of physical downlink control channels.

Optionally, the UE is configured by the base station by using radio resource control RRC signaling, a physical downlink control channel, or broadcast signaling that are sent by the base station at a point in time prior to the first subframe, to send at least one of a sounding reference signal SRS (Sounding Reference Signal), an uplink demodulation reference signal, channel state information, a scheduling request indicator, and random access information on the first part of symbols in the first subframe. Specifically, the SRS is classified into a periodic SRS and a non-periodic SRS, where the former is configured by using RRC dedicated signaling, and the latter is triggered or configured by a physical downlink control channel and only transmitted on a part of symbols of one subframe, for example, on the last symbol or a symbol in which an uplink demodulation reference signal is located. The channel state information CSI (Channel State Information) is classified into periodic CSI and non-periodic CSI, where the former is configured by using RRC dedicated signaling, and the latter is triggered or configured by a physical downlink control channel. The CSI may specifically include a channel quality indicator (Channel Quality Indicator), a rank indicator (RI, Rank Indicator), a precoding matrix indicator (PMI, Precoding Matrix Indicator), and the like. The CSI may be transmitted on the first part of symbols of the first subframe, for example, on a timeslot, namely, a half-subframe. The scheduling request indicator may be transmitted on the first part of symbols of the first subframe, for example, on a timeslot, namely, a half-subframe. The random access (RA, Random Access) information is classified into contention RA information and contention-free RA information, where the former is configured by using broadcast signaling, and the latter may be configured by using RRC dedicated signaling. The RA information may be transmitted on the first part of symbols of the first subframe, for example, the RA information is transmitted in an UpPTS timeslot of a special subframe, or transmitted in a timeslot of a subframe, or transmitted in another part of symbols. The uplink demodulation reference signal is sent on two symbols of a subframe, and may be configured by using RRC signaling, or triggered by a physical downlink control channel.

Step 13: The UE determines that the first uplink signal is a first type of uplink signal, where the first type of uplink signal occupies the first part of symbols of the first subframe, and the number of symbols included in the first part of symbols is less than the number of symbols included in the first subframe.

Specifically, the first type of uplink signal includes at least one of a sounding reference signal SRS, uplink acknowledgement/negative acknowledgement ACK/NACK information, an uplink demodulation reference signal, an uplink data channel, channel state information, a scheduling request indicator, and random access information. Information about how the first type of uplink signal occupies the first part of symbols is specifically described in step 12.

Step 14: The UE detects a downlink control channel on a second part of symbols in the first subframe, where the first part of symbols and the second part of symbols do not overlap in time domain.

Optionally, if the first subframe is on one TDD carrier, for example, only the TDD carrier is configured for the UE, both the first part of symbols and the second part of symbols in the first subframe are on the TDD carrier. For example, the first three symbols in the first subframe are the second part of symbols, specifically, a region in which the UE detects a physical downlink control channel, where the physical downlink control channel may be a PDCCH or an EPDCCH; and the last symbol in the first subframe is the first part of symbols, specifically, a symbol used by the UE to send the first uplink signal, where the first uplink signal may be a sounding reference signal SRS, an uplink data channel, or the like. Other symbol configurations may also apply, for example, a timeslot, an UpPTS region or a DwPTS region, and a conventional control region in the first subframe, where the conventional control region is a region in an LTE system in which a channel, such as a PDCCH, a downlink ACK/NACK channel, and a PCFICH, is transmitted and occupies the first n symbols in a subframe, where n is a natural number less than 5. In this embodiment, the first subframe can be understood as a flexible subframe, and the flexible subframe may be dynamically changed into an uplink subframe or a downlink subframe according to scheduling by the base station. If the UE is not configured by the base station to send the first uplink signal on the first part of symbols in the flexible subframe, which means that the subframe is not used by the base station as an uplink subframe, the UE detects a physical downlink control channel on the second part of symbols in the first subframe, that is to say, the subframe may be used by the base station as a downlink subframe or the UE considers the flexible subframe as a downlink subframe to detect a physical downlink control channel.

Optionally, if the first subframe is located on both the first carrier and the second carrier, the first carrier and the second carrier are two TDD carriers configured for the UE; and the first subframe on the first carrier is an uplink subframe and the first subframe on the second carrier is a downlink subframe, and a configuration of another carrier and a configuration of a subframe may also apply. In this case, an example of a symbol configuration may be that: the last symbol on the first carrier is the first part of symbols in the first subframe, namely, the first part of symbols configured to send the first uplink signal; and the first two symbols on the second carrier are the second part of symbols in the first subframe, namely the second part of the symbols used by the UE to detect a physical downlink control channel. Other symbol configurations may also apply, for example, a timeslot, an UpPTS region or a DwPTS region, and a conventional control region in the first subframe, where the conventional control region is a region in an LTE system in which a channel, such as a PDCCH, a downlink ACK/NACK channel, and a PCFICH, is transmitted and occupies the first n symbols in a subframe, where n is a natural number less than 5. In this embodiment, the UE is a half-duplex UE, which means that the UE cannot send and receive information at the same time. For example, the UE may have a same symbol in the uplink and downlink simultaneously, but the UE may either receive a signal on the first carrier or send a signal on the second carrier, and vice versa.

The practice in which the UE detects a physical downlink control channel on the second part of symbols in the first subframe may include the following options:

The physical downlink control channel includes at least one of a physical downlink control channel PDCCH (Physical Downlink Control Channel), an enhanced physical downlink control channel EPDCCH (Enhanced PDCCH), a downlink ACK/NACK channel, an enhanced downlink ACK/NACK channel, and a physical control format indicator channel PCFICH (Physical Control Format Indicator Channel). The PDCCH is a physical downlink control channel that is transmitted in a conventional control region in an earlier release of LTE system, for example, a PDCCH in an LTE system release 8-10. The EPDCCH is a physical downlink control channel that is transmitted based on channel precoding transmission, resources are allocated to the EPDCCH at the granularity of physical resource block pair or physical resource block, and the EPDCCH is used in LTE release 11 or release 12. The downlink ACK/NACK channel is a feedback channel that is sent in a conventional control region and is associated with a PUSCH. The enhanced downlink ACK/NACK channel is a downlink ACK/NACK channel introduced in LTE release 12 or later, and resources may be allocated to the enhanced downlink ACK/NACK channel at the granularity of physical resource block pair or physical resource block. The PCFICH is used to indicate the number of symbols that are occupied by a conventional control region in a subframe, and is sent on a first symbol in a subframe.

Optionally, after step 14, the foregoing method further includes that:

In one embodiment:

Step 15: If the physical downlink control channel schedules a downlink data channel in the first subframe, the UE receives the downlink data channel, and the UE skips sending the first uplink signal on the first part of symbols in the first subframe.

Specifically, the physical downlink control channel is a downlink scheduling assignment, if the UE detects the downlink scheduling assignment and the downlink scheduling assignment schedules or indicates transmission of a downlink data channel in the first subframe, for example, a PDSCH that will occupy the whole first subframe in time domain, then the UE receives the downlink data channel in the first subframe. Because the UE cannot receive and send at the same time, the UE skips sending the first uplink signal, for example, an SRS, on the first part of symbols in the first subframe, that is to say, it is determined that the UE skips a sending operation.

Alternatively, in another embodiment:

Step 15: If the physical downlink control channel schedules a downlink data channel in the first subframe, the UE receives the downlink data channel on a third part of symbols in the first subframe, and the UE sends the first uplink signal on the first part of symbols in the first subframe, where the first part of symbols and the third part of symbols do not overlap.

Specifically, the physical downlink control channel is a downlink scheduling assignment, if the UE detects the downlink scheduling assignment and the downlink scheduling assignment schedules or indicates transmission of a downlink data channel in the first subframe, for example, a PDSCH that may only occupy the third part of symbols in the first subframe in time domain, since the third part of symbols and the first part of symbols do not overlap, the UE may send the first uplink signal, for example, an SRS, on the first part of symbols in the first subframe. The downlink scheduling assignment may also schedule transmission of another downlink channel, for example, an ACK/NACK channel, on the third part of symbols.

Alternatively, in another embodiment:

Step 15: If the physical downlink control channel schedules a downlink data channel in the first subframe and the first uplink signal that the UE is configured to send on the first part of symbols is a non-periodic SRS, the UE sends the non-periodic SRS on the first part of symbols in the first subframe, and the UE skips receiving the downlink data channel in the first subframe.

Optionally, there is a guard time interval between the second part of symbols and the first part of symbols, and/or there is a guard time interval between the third part of symbols and the first part of symbols. The time interval may be pre-configured, or may be notified to the UE by signaling. The time interval is used as a switching point to separate downlink information reception from uplink information transmission for the UE.

Optionally, if the first uplink signal is not the first type of uplink signal, then:

the UE skips detecting a physical downlink control channel in the first subframe. An overlap between the first part of symbols and the second part of symbols may refer to partial overlap, or mean that the second part of symbols is included in the first part of symbols, or mean that the first part of symbols is included in the second part of symbols, or the like. Due to the overlap and the fact that the UE cannot send and receive information at the same time, the UE, according to the configurations performed by the base station before, sends the first uplink signal on the first part of symbols and skips detecting the physical downlink control channel on the second part of symbols.

The procedure of determining whether the UE can simultaneously perform reception and sending may not be limited to determining whether the first part of symbols and the second part of symbols overlap in time domain. Other approaches of the determining may be used, as long as a result of the determining can ascertain that the UE can or cannot receive and send information at the same time. For example, the procedure of the determining may also be that: a symbol on which the base station configures the UE to send the first uplink signal overlaps with the second part of symbols overlap.

The following describes in detail this embodiment of the present invention by using a specific example.

Figure 3:
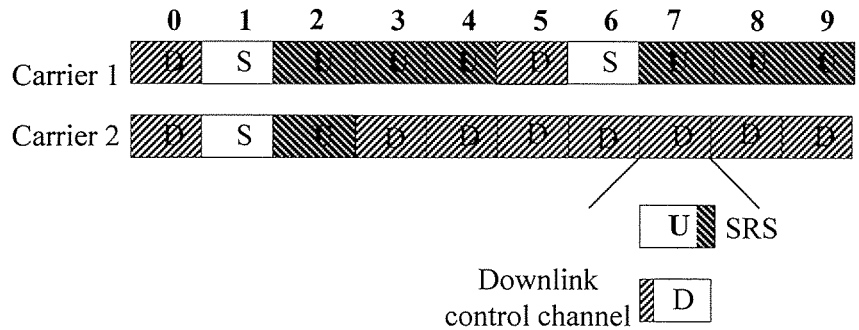
FIG. 3 is an application scenario diagram 1 of an information transmission method according to an embodiment of the present invention.

Aggregation of two TDD carriers with different uplink-downlink configurations is used as an example for description, and processing in other carrier aggregation scenarios is similar as in this example. As shown in FIG. 3, it is assumed that the first carrier is carrier 1 with specific TDD uplink-downlink configuration 0, and the second carrier is carrier 2 with specific uplink-downlink configuration 5. As an example, the first subframe is subframe 7 which is a conflicted subframe, to be specific, subframe 7 on carrier 1 is an uplink subframe, and subframe 7 on carrier 2 is a downlink subframe; the first uplink signal is a periodic SRS, where the periodic SRS is configured by the base station for the UE by using RRC signaling; the physical downlink control channel is a PDCCH in a conventional control region. It can be seen that, the first part of symbols of the first subframe is the last symbol in subframe 7 on carrier 1, the second part of symbols of the first subframe is the first n symbols in subframe 7 on carrier 2, and n is a natural number less than 5, that is to say, the first part of symbols and the second part of symbols do not overlap.

Therefore, the UE may determine that the first subframe is subframe 7, and determine that the SRS configured on subframe 7 is the first type of uplink signal, that is, the SRS occupies the first part of the symbols of subframe 7, for example, the last symbol.

That is, if a result of the determining is that the first part of symbols and the second part of symbols do not overlap, the UE detects a PDCCH in a conventional control region of subframe 7 on carrier 2. If the PDCCH is detected and the PDCCH schedules a common PDSCH of the current subframe, that is, the PDSCH occupies the whole subframe 7 in time domain, then the UE receives the PDSCH and skips sending the configured SRS on the first part of symbols in subframe 7 of carrier 1; on the contrary, if the UE does not detect the PDCCH or detects a special PDSCH that the PDSCH will only occupy the first timeslot of subframe 7, namely, the first seven symbols, the UE skips receiving or receives the special PDSCH in subframe 7 of carrier 2, and sends the configured periodic SRS on the first part of symbols, namely, the last symbol, in subframe 7 of carrier 1.

If a result of the determining is that the first part of symbols and the second part of symbols overlap, for example, a common PUSCH is scheduled in subframe 7 of carrier 1, since the PUSCH occupies the whole subframe 7 in time domain, the UE skips detecting the PDCCH in subframe 7 of carrier 2 but sends the PUSCH in subframe 7 of carrier 1.

It can be seen that, the method provided in the present invention can improve resource utilization of a half-duplex UE in a conflicted subframe in scenarios of the foregoing dynamic TDD carrier technology and aggregation of carriers with different uplink-downlink configurations, that is to say, the UE can separately receive and send on non-overlapped symbols in a same subframe.

The present invention provides an information transmission method in another embodiment, where the method may be used on a user equipment UE side, and includes:

determining, by a UE, a first subframe;

determining, by the UE, that uplink-downlink configurations of the first subframe are different on a first carrier and a second carrier, where the first carrier and the second carrier are carriers that are currently configured for the UE; and sending or receiving, by the UE, information in the first subframe of the first carrier, and skipping sending or receiving, by the UE, information in the first subframe of the second carrier.

Step 51: A UE determines a first subframe.

The first subframe may be a respective first subframe on a first carrier and a second carrier, and in this case, the first carrier and the second carrier are configured by a base station for the UE. The first carrier and the second carrier may be two TDD carriers, or may be one TDD carrier and one FDD carrier. Specifically, directions of the first subframes on the first carrier and the second carrier may specifically be that: the first subframe on the first carrier is a special subframe including a downlink pilot timeslot (DwPTS), a guard period (GP), and an uplink pilot timeslot (UpPTS) while the first subframe on the second carrier is a downlink subframe, and vice versa. Since a part of symbols on at least the first subframe has a different transmission direction when the first subframe is on the two different carriers, it can be seen that configurations of uplink and downlink subframes are different on the first carrier and the second carrier.

Step 52: The UE determines that uplink-downlink configurations of the first subframe are different on the first carrier and the second carrier, where the first carrier and the second carrier are carriers that are currently configured for the UE.

The first carrier and the second carrier are configured for the UE by using RRC signaling sent by a base station. Specifically, the first carrier is an anchor carrier, and the second carrier is a supplementary carrier; and the first carrier and the second carrier may be two TDD carriers, or may be one FDD carrier and one TDD carrier.

The uplink-downlink configurations of the first subframe are different on the first carrier and the second carrier, for example, the first subframe on the first carrier is a downlink subframe while the first subframe on the second carrier is an uplink subframe, and vice versa. Alternatively, the first subframe on the first carrier is a TDD special subframe including three parts, namely, a DwPTS, a GP, and an UpPTS, whereas the first subframe on the second carrier is an uplink subframe or a downlink subframe.

Step 53: The UE sends or receives information in the first subframe of the first carrier, and the UE skips sending or receiving information in the first subframe of the second carrier.

The UE may use a subframe configuration configured for an anchor carrier to determine a transmission configuration of the first subframe on the anchor carrier.

If the first carrier is an anchor carrier, the UE may use a transmission mode configured, in a subframe configuration of an anchor carrier, for the first subframe on the anchor carrier, namely, on the first carrier; and the first subframe may be a downlink subframe, or an uplink subframe, or a special subframe including a downlink pilot timeslot (DwPTS), a guard period (GP), and an uplink pilot timeslot (UpPTS). In addition, the UE sends or receives a corresponding uplink/downlink signal on the first carrier.

Optionally, the UE may skip sending or receiving a signal in the first subframe corresponding to the second carrier.

Optionally, the UE determines, according to a transmission direction in the first subframe corresponding to the second carrier and based on a timeslot configuration of the first subframe corresponding to the first carrier, a time length for downlink signal reception and a time length for uplink signal transmission in the first subframe corresponding to the second carrier, where the time length for downlink signal reception may be equal to or less than a time length for downlink signal reception in the first subframe corresponding to the first carrier, and the UE only receives a downlink signal or only sends an uplink signal.

Optionally, in the first subframe corresponding to the second carrier, the UE may receive downlink control signaling (PDCCH), but may skip receiving a downlink data channel or skip receiving any uplink data transmission.

Optionally, in the first subframe corresponding to the second carrier, the UE may use a timeslot configuration that is the same as the timeslot configuration of the first subframe corresponding to the first carrier, to receive a downlink signal and send an uplink signal.

The following describes in detail this embodiment of the present invention by using four specific examples.

Figure 4:
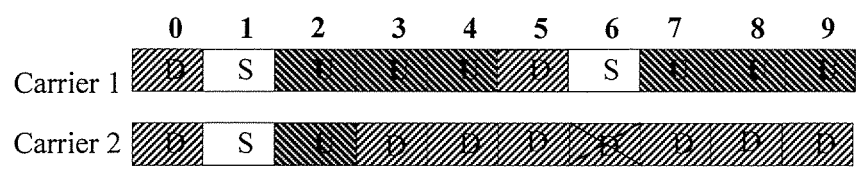
FIG. 4 is an application scenario diagram 2 of an information transmission method according to an embodiment of the present invention.

Aggregation of two TDD carriers with different uplink-downlink configurations is used as an example for description, and processing in other carrier aggregation scenarios is similar as in this example. As shown in FIG. 4, it is assumed that the first carrier is carrier 1 with specific TDD uplink-downlink configuration 0, and the second carrier is carrier 2 with specific uplink-downlink configuration 5. In addition, the first carrier is configured as an anchor carrier, and the second carrier is configured as a supplementary carrier. The UE determines that the first subframe is subframe 6 which is a conflicted subframe, to be specific, subframe 6 on carrier 1 is a special subframe including a downlink pilot timeslot (DwPTS), a guard period (GP), and an uplink pilot timeslot (UpPTS), and subframe 6 on carrier 2 is a downlink subframe. The UE determines, according to a configuration on the anchor carrier, namely, a configuration on carrier 1, that signal receiving and sending on DwPTS and UpPTS should be performed on the first carrier according to a configuration of a special subframe. Subframe 6 on carrier 2 is a downlink subframe, which is different from the configuration on carrier 1. Therefore, a terminal may completely skip receiving any information sent by an eNB on subframe 6 corresponding to carrier 2.

Figure 5:
FIG. 5 is an application scenario diagram 3 of an information transmission method according to an embodiment of the present invention.

Aggregation of two TDD carriers with different uplink-downlink configurations is used as an example for description, and processing in other carrier aggregation scenarios is similar as in this example. As shown in FIG. 5, it is assumed that the first carrier is carrier 1 with specific TDD uplink-downlink configuration 0, and the second carrier is carrier 2 with specific uplink-downlink configuration 5. In addition, the first carrier is configured as an anchor carrier, and the second carrier is configured as a supplementary carrier. The UE determines that the first subframe is subframe 6 which is a conflicted subframe, to be specific, subframe 6 on carrier 1 is a special subframe including a downlink pilot timeslot (DwPTS), a guard period (GP), and an uplink pilot timeslot (UpPTS), and subframe 6 on carrier 2 is a downlink subframe. The UE determines, according to a configuration on the anchor carrier, namely, a configuration on carrier 1, that signal receiving and sending on DwPTS and UpPTS should be performed on the first carrier according to a configuration of a special subframe.

According to configurations of the first carrier and the second carrier, there are two different scenarios. In scenario 1, timing advance for uplink transmission on the first carrier is the same as timing advance for uplink transmission on the second carrier; in scenario 2, timing advance for uplink transmission on the first carrier is different from timing advance for uplink transmission on the second carrier. Description is provided based on the foregoing two scenarios.

In scenario 1, configurations of subframe 6 are different on carrier 2 and carrier 1, and subframe 6 is a downlink subframe on carrier 2 while it is configured as a special subframe on carrier 1, where a DwPTS length is less than a length of a complete downlink subframe. In subframe 6 of carrier 2, the UE may use a timeslot configuration that corresponds to subframe 6 on carrier 1 and whose timeslot length is equal to or less than a length of subframe 6 on carrier 1, to receive downlink data, but the UE does not need to send uplink data.

Configurations of subframe 6 are different on carrier 2 and carrier 1; and subframe 6 is a downlink subframe on carrier 2 while it is configured as a special subframe on carrier 1, where a DwPTS length is less than a length of a complete downlink subframe. The UE may adjust, according to the DwPTS length in subframe 6 corresponding to carrier 1, and according to a difference between timing advance for uplink transmission on carrier 1 and timing advance for uplink transmission on carrier 2, a downlink data receiving length in subframe 6 of carrier 2. If the difference in timing advance for uplink transmission is not an integral multiple of a minimum transmission symbol, the timing advance difference is rounded down to a nearest integer, and the downlink data receiving length on carrier 2 is adjusted according to the integral multiple of the minimum transmission symbol; the adjusted downlink receiving length may be a downlink length configuration that is defined in the existing protocol and is most close to the adjusted downlink receiving length, and it is ensured that the adjusted downlink receiving length is less than an actual available receiving length that is obtained by calculating according to the DwPTS on carrier 1 and the uplink timing advance difference between the carriers. The UE receives downlink data in subframe 6 according to the adjusted downlink data receiving length on carrier 2. However, the UE does not need to send uplink data.

In scenario 2:

Configurations of subframe 6 are different on carrier 2 and carrier 1; and subframe 6 is a downlink subframe on carrier 2 while it is configured as a special subframe on carrier 1, where a DwPTS length is less than a length of a complete downlink subframe. The UE may adjust, according to the DwPTS length in subframe 6 corresponding to carrier 1, and according to a difference between timing advance for uplink transmission on carrier 1 and timing advance for uplink transmission on carrier 2, a downlink data receiving length in subframe 6 of carrier 2. If the difference in timing advance for uplink transmission is not an integral multiple of a minimum transmission symbol, the timing advance difference is rounded down to a nearest integer, and the downlink data receiving length on carrier 2 is adjusted according to the integral multiple of the minimum transmission symbol; the adjusted downlink receiving length may be a downlink length configuration that is defined in the existing protocol and is most close to the adjusted downlink receiving length, and it is ensured that the adjusted downlink receiving length is less than an actual available receiving length that is obtained by calculating according to the DwPTS on carrier 1 and the uplink timing advance difference between the carriers. The UE receives downlink data in subframe 6 according to the adjusted downlink data receiving length on carrier 2. However, the UE does not need to send uplink data.

Figure 6:
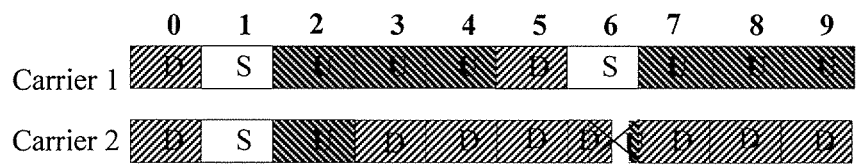
FIG. 6 is an application scenario diagram 4 of an information transmission method according to an embodiment of the present invention.
Figure 7:
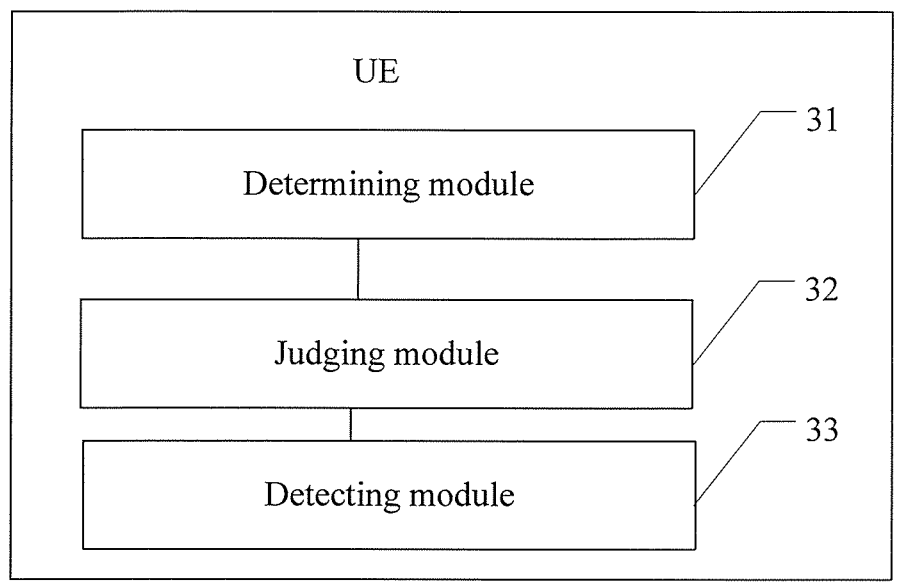
FIG. 7 is a UE according to an embodiment of the present invention.
Figure 8:
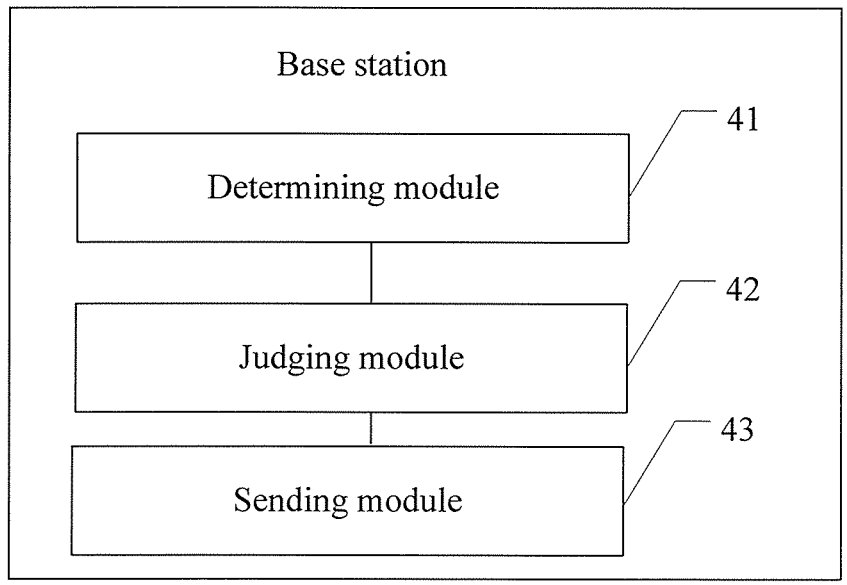
FIG. 8 is a base station according to an embodiment of the present invention.

Aggregation of two TDD carriers with different uplink-downlink configurations is used as an example for description, and processing in other carrier aggregation scenarios is similar as in this example. As shown in FIG. 6, it is assumed that the first carrier is carrier 1 with specific TDD uplink-downlink configuration 0, and the second carrier is carrier 2 with specific uplink-downlink configuration 5. In addition, the first carrier is configured as an anchor carrier, and the second carrier is configured as a supplementary carrier. The UE determines that the first subframe is subframe 6 which is a conflicted subframe, to be specific, subframe 6 on carrier 1 is a special subframe including a downlink pilot timeslot (DwPTS), a guard period (GP), and an uplink pilot timeslot (UpPTS), and subframe 6 on carrier 2 is a downlink subframe. The UE determines, according to a configuration on the anchor carrier, namely, a configuration on carrier 1, that signal receiving and sending on DwPTS and UpPTS should be performed on the first carrier according to a configuration of a special subframe. Subframe 6 on carrier 2 is a downlink subframe, which is different from the configuration on carrier 1. Therefore, a terminal may only receive PDCCH information sent by an eNB in subframe 6 corresponding to carrier 2, but does not need to receive other data information.

The present invention further provides an information transmission method, where the method may be used on a base station side, and includes that:

Step 21: A base station determines a first subframe.

Optionally, in an embodiment of the present invention, the first subframe may be a first subframe on a TDD carrier, and in this case, only the TDD carrier is configured by the base station for a UE; or optionally, the first subframe may be a respective first subframe on a first carrier and a second carrier, and in this case, the first carrier and the second carrier are configured by the base station for a UE. The first carrier and the second carrier may be two TDD carriers, or may be one TDD carrier and one FDD carrier.

For description of a relationship between another first subframe and a carrier, refer to the method used on a UE side, and details are not described herein again.

Step 22: The base station configures a UE to send a first uplink signal in the first subframe.

Step 23: The base station determines that the first uplink signal is a first type of uplink signal, where the first type of uplink signal occupies a first part of symbols of the first subframe, and the number of symbols included in the first part of symbols is less than the number of symbols included in the first subframe.

Step 24: The base station sends a downlink control channel to the UE on a second part of symbols in the first subframe, where the first part of symbols and the second part of symbols do not overlap in time domain.

Optionally, the first type of uplink signal includes at least one of a sounding reference signal SRS, uplink acknowledgement/negative acknowledgement ACK/NACK information, an uplink demodulation reference signal, an uplink data channel, channel state information, a scheduling request indicator, and random access information.

Optionally, the first part of symbols and the second part of symbols in the first subframe are on one time division duplex TDD carrier; or optionally, the first part of symbols in the first subframe is on a first carrier, the second part of symbols in the first subframe is on a second carrier, and uplink/downlink subframe configurations are different on the first carrier and the second carrier; and the UE is a half-duplex UE.

Specifically, relationships between the first subframe and both the first part of symbols and the second part of symbols are described in the method used on a UE side, and details are not described herein again.

Optionally, the first subframe on the first carrier or the second carrier is a TDD special subframe.

Optionally, the base station configures, by using an uplink scheduling grant sent by the base station at a point in time prior to the first subframe, the UE to send an uplink data channel on the first part of symbols in the first subframe; or the base station configures, by using a physical downlink control channel and/or downlink data channel sent by the base station at a point in time prior to the first subframe, the UE to send uplink acknowledgement/negative acknowledgement ACK/NACK information on the first part of symbols in the first subframe; or the base station configures, by using radio resource control RRC signaling, a physical downlink control channel, or broadcast signaling that are sent by the base station at a point in time prior to the first subframe, the UE to send at least one of a sounding reference signal SRS (Sounding Reference Signal), an uplink demodulation reference signal, channel state information, a scheduling request indicator, and random access information on the first part of symbols in the first subframe. Details are specifically described in the method used on a UE side, and not described herein again.

Optionally, the physical downlink control channel includes at least one of a physical downlink control channel PDCCH (Physical Downlink Control Channel), an enhanced physical downlink control channel EPDCCH (Enhanced PDCCH), a downlink ACK/NACK channel, an enhanced downlink ACK/NACK channel, and a physical control format indicator channel PCFICH (Physical Control Format Indicator Channel). Details are specifically described in the method used on a UE side, and not described herein again.

Optionally, the first part of symbols is a symbol, a timeslot or an UpPTS region in the first subframe, and/or the second part of symbols is a symbol, a timeslot, a DwPTS region, or a conventional downlink control channel region in the first subframe.

Optionally, the physical downlink control channel is a downlink scheduling assignment.

After the base station sends a physical downlink control channel to the UE on the second part of symbols in the first subframe, the method further includes:

Step 20: The base station sends a downlink data channel to the UE in the first subframe, where the downlink data channel is indicated or scheduled by the downlink scheduling assignment; and the base station skips detecting the first uplink signal on the first part of symbols in the first subframe; or Step 20: The base station sends a downlink data channel to the UE on a third part of symbols in the first subframe, where the downlink data channel is indicated or scheduled by the downlink scheduling assignment, where the third part of symbols and the first part of symbols do not overlap; and the base station receives the first uplink signal on the first part of symbols in the first sub frame.

Optionally, there is a guard time interval between the second part of symbols and the first part of symbols, and/or there is a guard time interval between the third part of symbols and the first part of symbols.

It can be seen that, the method provided in the present invention can improve resource utilization of a half-duplex UE in a conflicted subframe in scenarios of the foregoing dynamic TDD carrier technology and aggregation of carriers with different uplink-downlink configurations, that is to say, the UE can separately receive and send on non-overlapped symbols in a same subframe.

The present invention further provides an information transmission method, where the method may be used on a base station side, and includes that:

determining, by a base station, a first subframe, where uplink-downlink configurations of the first subframe are different on a first carrier and a second carrier; and the first carrier and the second carrier are carriers that are currently configured for a UE; and in the first subframe of the first carrier, sending or receiving, by the base station, information to the UE or information sent by the UE; and in the first subframe of the first carrier, skipping sending information to the UE or skipping receiving information sent by the UE.

Step 61: A base station determines a first subframe, where uplink-downlink configurations of the first subframe are different on a first carrier and a second carrier; and the first carrier and the second carrier are carriers that are currently configured for a UE.

The first subframe may be a respective first subframe on the first carrier and the second carrier, and in this case, the first carrier and the second carrier are configured by the base station. The first carrier and the second carrier may be configured by the base station as two TDD carriers, or may be configured as one TDD carrier and one FDD carrier. Specifically, directions of the first subframes on the first carrier and the second carrier may specifically be that: the first subframe on the first carrier is a special subframe including a downlink pilot timeslot (DwPTS), a guard period (GP), and an uplink pilot timeslot (UpPTS) while the first subframe on the second carrier is a downlink subframe, and vice versa. Since a part of symbols on at least the first subframe has a different transmission direction when the first subframe is on the two different carriers, it can be seen that configurations of uplink and downlink subframes are different on the first carrier and the second carrier.

Step 62: In the first subframe of the first carrier, the base station sends information to the UE or receives information sent by the UE; and in the first subframe of the second carrier, the UE skips sending information to the UE or skips receiving information sent by the UE.

The first carrier and the second carrier are configured for the UE by the base station by using RRC signaling. Specifically, the first carrier is an anchor carrier, and the second carrier is a supplementary carrier; and the first carrier and the second carrier may be two TDD carriers, or may be one FDD carrier and one TDD carrier.

The uplink-downlink configurations of the first subframe are different on the first carrier and the second carrier, for example, the first subframe on the first carrier is a downlink subframe while the first subframe on the second carrier is an uplink subframe, and vice versa. Alternatively, the first subframe on the first carrier is a TDD special subframe including three parts, namely, a DwPTS, a GP, and an UpPTS, whereas the first subframe on the second carrier is an uplink subframe or a downlink subframe.

The base station uses a subframe configuration configured for an anchor carrier to determine a transmission configuration of the first subframe on the anchor carrier.

If the first carrier is an anchor carrier, the base station may use a transmission mode configured, in a subframe configuration of an anchor carrier, for the first subframe on the anchor carrier, namely, on the first carrier; and the first subframe may be a downlink subframe or an uplink subframe, or a special subframe including a downlink pilot timeslot (DwPTS), a guard period (GP), and an uplink pilot timeslot (UpPTS). In addition, the base station sends or receives a corresponding downlink/uplink signal on the first carrier.

Optionally, the base station may completely skip sending or receiving any signal in the first subframe corresponding to the second carrier.

Optionally, the base station may determine, according to a transmission direction of the first subframe corresponding to the second carrier and based on a timeslot configuration of the first subframe corresponding to the first carrier, a time length for downlink signal reception and a time length for uplink signal transmission in the first subframe corresponding to the second carrier, where the time length for downlink signal reception may be equal to or less than a time length for downlink signal reception in the first subframe corresponding to the first carrier, and the base station only receives a downlink signal or only sends an uplink signal. Optionally, in the first subframe corresponding to the second carrier, the base station may send downlink control signaling (PDCCH), but may skip sending a downlink data channel or skip receiving any uplink data transmission.

Optionally, in the first subframe corresponding to the second carrier, the base station may use a timeslot configuration that is the same as the timeslot configuration of the first subframe corresponding to the first carrier, to send a downlink signal and receive an uplink signal.

The present invention further provides a UE, including:
a determining module, configured to determine a first subframe for the UE;
a judging module, configured to determine for the UE that a first uplink signal is a first type of uplink signal, where the first type of uplink signal occupies a first part of symbols of the first subframe, and the number of symbols included in the first part of symbols is less than the number of symbols included in the first subframe; and
a detecting module, configured to: if the UE is configured to send the first uplink signal on the first part of symbols in the first subframe, detect a physical downlink control channel on a second part of symbols in the first subframe, where the first part of symbols and the second part of symbols do not overlap in time domain.

Optionally, the first part of symbols and the second part of symbols in the first subframe are on one time division duplex TDD (Time Division Duplex) carrier; or the first part of symbols in the first subframe is on a first carrier while the second part of symbols in the first subframe is on a second carrier, uplink/downlink subframe configurations are different on the first carrier and the second carrier; and the UE is a half-duplex UE.

Optionally, the first subframe on the first carrier or the second carrier is a TDD special subframe.

Optionally, the UE is configured to send the first uplink signal on the first part of symbols in the first subframe and includes:
a sending module, configured to: when the UE is configured by a base station by using an uplink scheduling grant sent by the base station at a point in time prior to the first subframe, send an uplink data channel on the first part of symbols in the first sub frame;
when the UE is configured by the base station by using a physical downlink control channel and/or downlink data channel sent by the base station at a point in time prior to the first subframe, send uplink acknowledgement/negative acknowledgement ACK/NACK information on the first part of symbols in the first subframe; or
when the UE is configured by the base station by using radio resource control RRC signaling, a physical downlink control channel, or broadcast signaling that are sent by the base station at a point in time prior to the first subframe, send at least one of a sounding reference signal SRS (Sounding Reference Signal), an uplink demodulation reference signal, channel state information, a scheduling request indicator, and random access information on the first part of symbols in the first subframe.

Optionally, the practice in which the UE detects a physical downlink control channel on the second part of symbols in the first subframe includes the following options:
the physical downlink control channel includes at least one of a physical downlink control channel PDCCH (Physical Downlink Control Channel), an enhanced physical downlink control channel EPDCCH (Enhanced PDCCH), a downlink ACK/NACK channel, an enhanced downlink ACK/NACK channel, and a physical control format indicator channel PCFICH (Physical Control Format Indicator Channel).

Optionally, the first part of symbols is a symbol, a timeslot or an UpPTS region in the first subframe, and/or
the second part of symbols is a symbol, a timeslot, a DwPTS region, or a conventional downlink control channel region in the first subframe.

Optionally, after the UE detects a physical downlink control channel on the second part of symbols in the first subframe, the UE further includes:
a receiving module, configured to: if the physical downlink control channel schedules a downlink data channel in the first subframe, receive the downlink data channel for the UE; and
a sending module, configured to determine that the UE skips sending the first uplink signal on the first part of symbols in the first subframe;
or
a receiving module, configured to: if the physical downlink control channel schedules a downlink data channel in the first subframe, receive the downlink data channel on a third part of symbols in the first subframe for the UE; and a sending module, configured to send the first uplink signal on the first part of symbols in the first subframe for the UE, where the first part of symbols and the third part of symbols do not overlap;
or
a processing module, configured to: if the physical downlink control channel schedules a downlink data channel in the first subframe and the first uplink signal that the UE is configured to send on the first part of symbols is a non-periodic SRS, send the non-periodic SRS on the first part of symbols in the first subframe for the UE, and skip receiving the downlink data channel in the first subframe for the UE.

Optionally, there is a guard time interval between the second part of symbols and the first part of symbols, and/or there is a guard time interval between the third part of symbols and the first part of symbols.

Optionally, the detecting module is configured to: if the first uplink signal is not the first type of uplink signal, skip detecting a physical downlink control channel in the first subframe for the UE.

Details are specifically described in the method used on a UE side, and not described herein again.

It can be seen that, the UE provided in the present invention can improve resource utilization of a half-duplex UE in a conflicted subframe in scenarios of the foregoing dynamic TDD carrier technology and aggregation of carriers with different uplink-downlink configurations, that is to say, the UE can separately receive and send on non-overlapped symbols in a same subframe.

The present invention further provides a UE, including:

a determining module, configured to determine a first subframe for the UE;

a judging module, configured to determine, for the UE, that uplink-downlink configurations of the first subframe are different on a first carrier and a second carrier, where the first carrier and the second carrier are carriers that are currently configured for the UE; and a processing module, configured to send or receive information in the first subframe of the first carrier for the UE, and skip sending or receiving information in the first subframe of the second carrier for the UE.

The determining module is configured to determine a first subframe for the UE;

the judging module is configured to determine that uplink-downlink configurations of the first subframe are different on the first carrier and the second carrier, where the first carrier and the second carrier are carriers that are currently configured for the UE; and the first carrier and the second carrier are configured for the UE by using RRC signaling sent by a base station. Specifically, the first carrier is an anchor carrier, and the second carrier is a supplementary carrier; and the first carrier and the second carrier may be two TDD carriers, or may be one FDD carrier and one TDD carrier.

The uplink-downlink configurations of the first subframe are different on the first carrier and the second carrier, for example, the first subframe on the first carrier is a downlink subframe while the first subframe on the second carrier is an uplink subframe, and vice versa. Alternatively, the first subframe on the first carrier is a TDD special subframe including three parts, namely, a DWPTS, a GP, and an UpPTS, whereas the first subframe on the second carrier is an uplink subframe or a downlink subframe.

The processing module is configured to send or receive information in the first subframe of the first carrier for the UE, and skip sending or receiving information in the first subframe of the second carrier for the UE.

The UE may use a subframe configuration configured for an anchor carrier to determine a transmission configuration of the first subframe on the anchor carrier.

If the first carrier is an anchor carrier, the UE may use a transmission mode configured, in a subframe configuration of an anchor carrier, for the first subframe on the anchor carrier, namely, on the first carrier; and the first subframe may be a downlink subframe or an uplink subframe, or a special subframe including a downlink pilot timeslot (DwPTS), a guard period (GP), and an uplink pilot timeslot (UpPTS). In addition, the UE sends or receives a corresponding uplink/downlink signal on the first carrier.

Optionally, the UE may completely skip sending or receiving any signal in the first subframe corresponding to the second carrier.

Optionally, the UE determines, according to a transmission direction in the first subframe corresponding to the second carrier and based on a timeslot configuration of the first subframe corresponding to the first carrier, a time length for downlink signal reception and a time length for uplink signal transmission in the first subframe corresponding to the second carrier, where the time length for downlink signal reception may be equal to or less than a time length for downlink signal reception in the first subframe corresponding to the first carrier, but the UE only receives a downlink signal or only sends an uplink signal.

Optionally, in the first subframe corresponding to the second carrier, the UE may receive downlink control signaling (PDCCH), but may skip receiving a downlink data channel or skip receiving any uplink data transmission.

Optionally, in the first subframe corresponding to the second carrier, the UE may use a timeslot configuration that is the same as the timeslot configuration of the first subframe corresponding to the first carrier, to receive a downlink signal and send an uplink signal.

The present invention further provides a base station, including:

a determining module, configured to determine a first subframe for the base station;

the base station configures a UE to send a first uplink signal in the first subframe;

a judging module, configured to determine for the base station that the first uplink signal is a first type of uplink signal, where the first type of uplink signal occupies a first part of symbols of the first subframe, and the number of symbols included in the first part of symbols is less than the number of symbols included in the first subframe; and a sending module, configured to send a downlink control channel to the UE on a second part of symbols in the first subframe for the base station, where the first part of symbols and the second part of symbols do not overlap in time domain.

Optionally, the first type of uplink signal includes at least one of a sounding reference signal SRS, uplink acknowledgement/negative acknowledgement ACK/NACK information, an uplink demodulation reference signal, an uplink data channel, channel state information, a scheduling request indicator, and random access information.

Optionally, the first part of symbols and the second part of symbols in the first subframe are on one time division duplex TDD (Time Division Duplex) carrier; or the first part of symbols in the first subframe is on a first carrier while the second part of symbols in the first subframe is on a second carrier, uplink/downlink subframe configurations are different on the first carrier and the second carrier; and the UE is a half-duplex UE.

Optionally, the first subframe on the first carrier or the second carrier is a TDD special subframe.

Optionally, the base station configures the UE to send the first uplink signal on the first part of symbols in the first subframe and includes:

a configuring module, configured to configure, by using an uplink scheduling grant sent by the base station at a point in time prior to the first subframe, the UE to send an uplink data channel on the first part of symbols in the first subframe for the base station;

configure, by using a physical downlink control channel and/or downlink data channel sent by the base station at a point in time prior to the first subframe, the UE to send uplink acknowledgement/negative acknowledgement ACK/NACK information on the first part of symbols in the first subframe for the base station; or configure, by using radio resource control RRC signaling, a physical downlink control channel, or broadcast signaling that are sent by the base station at a point in time prior to the first subframe, the UE to send at least one of a sounding reference signal SRS (Sounding Reference Signal), an uplink demodulation reference signal, channel state information, a scheduling request indicator, and random access information on the first part of symbols in the first subframe for the base station.

Optionally, the practice in which the base station sends a physical downlink control channel to the UE on the second part of symbols in the first subframe includes:

the physical downlink control channel includes at least one of a physical downlink control channel PDCCH (Physical Downlink Control Channel), an enhanced physical downlink control channel EPDCCH (Enhanced PDCCH), a downlink ACK/NACK channel, an enhanced downlink ACK/NACK channel, and a physical control format indicator channel PCFICH (Physical Control Format Indicator Channel).

Optionally, the first part of symbols is a symbol, a timeslot or an UpPTS region in the first subframe, and/or the second part of symbols is a symbol, a timeslot, a DwPTS region, or a conventional downlink control channel region in the first subframe.

Optionally, the physical downlink control channel is a downlink scheduling assignment.

After the base station sends the physical downlink control channel to the UE on the second part of symbols in the first subframe, the base station further includes:

a sending module, configured to send a downlink data channel to the UE in the first subframe for the base station, where the downlink data channel is indicated or scheduled by the downlink scheduling assignment; and a receiving module, configured to determine that the base station skips detecting the first uplink signal on the first part of symbols in the first subframe;

or a sending module, configured to send a downlink data channel to the UE on a third part of symbols in the first subframe for the base station, where the downlink data channel is indicated or scheduled by the downlink scheduling assignment, where the third part of symbols and the first part of symbols do not overlap; and a receiving module, configured to receive the first uplink signal on the first part of symbols in the first subframe for the base station.

Optionally, there is a guard time interval between the second part of symbols and the first part of symbols, and/or there is a guard time interval between the third part of symbols and the first part of symbols.

Details are specifically described in the method used on a base station side, and not described herein again.

The present invention further provides a base station, including:

a determining module, configured to determine a first subframe for the base station, where uplink-downlink configurations of the first subframe are different on a first carrier and a second carrier; and the first carrier and the second carrier are carriers that are currently configured for a UE; and a processing module, configured to: in the first subframe of the second carrier and for the base station, send information to the UE or receive information sent by the UE; and in the first subframe of the second carrier and for the base station, skip sending information to the UE or skip receiving information sent by the UE.

The determining module is configured to determine a first subframe for the base station, where uplink-downlink configurations of the first subframe on a first carrier and a second carrier are different; and the first carrier and the second carrier are carriers that are currently configured for a UE; and the first subframe may be a respective first subframe on the first carrier and the second carrier, and in this case, the first carrier and the second carrier are configured by the base station. The first carrier and the second carrier may be configured as two TDD carriers, or may be configured as one TDD carrier and one FDD carrier by the base station. Specifically, directions of the first subframes on the first carrier and the second carrier may specifically be that: the first subframe on the first carrier is a special subframe including a downlink pilot timeslot (DwPTS), a guard period (GP), and an uplink pilot timeslot (UpPTS), while the first subframe on the second carrier is a downlink subframe, and vice versa. Since a part of symbols on at least the first subframe has a different transmission direction when the first subframe is on the two different carriers, it can be seen that configurations of uplink and downlink subframes are different on the first carrier and the second carrier.

The processing module is configured to: in the first subframe of the second carrier and for the base station, send information to the UE or receive information sent by the UE; and in the first subframe of the second carrier and for the base station, skip sending information to the UE or skip receiving information sent by the UE.

The first carrier and the second carrier are configured for the UE by the base station by using RRC signaling. Specifically, the first carrier is an anchor carrier, and the second carrier is a supplementary carrier; and the first carrier and the second carrier may be two TDD carriers, or may be one FDD carrier and one TDD carrier.

The uplink-downlink configurations of the first subframe are different on the first carrier and the second carrier, for example, the first subframe on the first carrier is a downlink subframe while the first subframe on the second carrier is an uplink subframe, and vice versa. Alternatively, the first subframe on the first carrier is a TDD special subframe including three parts, namely, a DwPTS, a GP, and an UpPTS, whereas the first subframe on the second carrier is an uplink subframe or a downlink subframe.

The base station uses a subframe configuration configured for an anchor carrier to determine a transmission configuration of the first subframe on the anchor carrier.

If the first carrier is an anchor carrier, the UE may use a transmission mode configured, in a subframe configuration of an anchor carrier, for the first subframe on the anchor carrier, namely, on the first carrier; and the first subframe may be a downlink subframe or an uplink subframe, or a special subframe including a downlink pilot timeslot (DwPTS), a guard period (GP), and an uplink pilot timeslot (UpPTS). In addition, the base station sends or receives a corresponding downlink/uplink signal on the first carrier.

Optionally, the base station may completely skip sending or receiving any signal in the first subframe corresponding to the second carrier.

Optionally, the base station may determine, according to a transmission direction in the first subframe corresponding to the second carrier and based on a timeslot configuration of the first subframe corresponding to the first carrier, a time length for downlink signal reception and a time length for uplink signal transmission in the first subframe corresponding to the second carrier, where the time length for downlink signal reception may be equal to or less than a time length for downlink signal reception in the first subframe corresponding to the first carrier, and the base station only receives a downlink signal or only sends an uplink signal.

Optionally, in the first subframe corresponding to the second carrier, the base station may send downlink control signaling (PDCCH), but may skip sending a downlink data channel or skip receiving any uplink data transmission.

Optionally, in the first subframe corresponding to the second carrier, the base station may use a timeslot configuration that is the same as the timeslot configuration of the first subframe corresponding to the first carrier, to send a downlink signal and receive an uplink signal.

It can be seen that, the base station provided in the present invention can improve resource utilization of a half-duplex UE in a conflicted subframe in scenarios of the foregoing dynamic TDD carrier technology and aggregation of carriers with different uplink-downlink configurations, that is to say, the UE can separately receive and send on non-overlapped symbols in a same subframe.

It should be understood that, the technical solutions of the embodiments of the present invention may be applied to various communications systems, such as: a Global System for Mobile Communications (Global System for Mobile Communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system or the like.

It should also be understood that in the embodiments of the present invention, a user equipment (User Equipment, UE for short) may be referred to as a terminal (Terminal), a mobile station (Mobile Station, MS for short), a mobile terminal (Mobile Terminal), and the like. The user equipment may communicate with one or more core networks through a radio access network (Radio Access Network, RAN for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base station (Base Transceiver Station, "BTS" for short) in the GSM or CDMA, may also be a base station (NodeB, "NB" for short) in the WCDMA, and may further be an evolved NodeB (Evolved Node B, "eNB" or "e-NodeB" for short) in the LTE, which is not limited in the present invention. For ease of description, the following embodiments use the base station eNB and the user equipment UE as examples.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or modules may be combined or integrated into another system, or some features may be ignored or not performed.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
   determining, by a user equipment (UE), a first subframe;
   determining, by the UE, a first uplink signal to be sent in the first subframe;
   determining, by the UE, whether the first uplink signal is a first type of uplink signal, wherein the first type of uplink signal occupies a first part of symbols of the first subframe, and the number of symbols comprised in the first part of symbols is less than the number of symbols comprised in the first subframe; and
   if the first uplink signal is the first type of uplink signal, detecting, by the UE, a downlink control channel on a second part of symbols in the first subframe, wherein the first part of symbols and the second part of symbols do not overlap in time domain.

2. The method according to claim 1, wherein the first type of uplink signal comprises at least one of a sounding reference signal (SRS), uplink acknowledgement/negative acknowledgement (ACK/NACK) information, an uplink demodulation reference signal, an uplink data channel, channel state information, a scheduling request indicator, and random access information.

3. The method according to claim 1, wherein:
   the first part of symbols and the second part of symbols in the first subframe are on one time division duplex (TDD) carrier, or
   the first part of symbols in the first subframe is on a first carrier, the second part of symbols in the first subframe is on a second carrier, and uplink/downlink subframe configurations are different on the first carrier and the second carrier; and the UE is a half-duplex UE.

4. The method according to claim 3, wherein the first subframe on the first carrier or the second carrier is a TDD special subframe.

5. The method according to claim 1, wherein determining, by the UE, to send a first uplink signal in the first subframe comprises:
   sending, by the UE, an uplink data channel on the first part of symbols in the first subframe according to an uplink scheduling grant sent by a base station at a point in time prior to the first subframe; or
   sending, by the UE, uplink acknowledgement/negative acknowledgement (ACK/NACK) information on the first part of symbols in the first subframe according to a physical downlink control channel and/or downlink data channel sent by the base station at a point in time prior to the first subframe; or
   sending, by the UE, at least one of a sounding reference signal (SRS), an uplink demodulation reference signal, channel state information, a scheduling request indicator, and random access information on the first part of symbols in the first subframe according to at least one of radio resource control (RRC) signaling, a physical downlink control channel, and broadcast signaling that are sent by the base station at a point in time prior to the first subframe.

6. The method according to claim 1, wherein detecting a downlink control channel comprises:
  detecting at least one of a physical downlink control channel (PDCCH), an enhanced physical downlink control channel (EPDCCH), a downlink acknowledgement/negative acknowledgement (ACK/NACK) channel, an enhanced downlink ACK/NACK channel, and a physical control format indicator channel (PCFICH).

7. The method according to claim 1, wherein:
  the first part of symbols is a symbol, a timeslot, or an uplink pilot timeslot (UpPTS) region in the first subframe; and/or
  the second part of symbols is a symbol, a timeslot, a downlink pilot timeslot (DwPTS) region, or a conventional downlink control channel region in the first subframe.

8. The method according to claim 1, wherein after detecting, by the UE, a downlink control channel on a second part of symbols in the first subframe, the method further comprises:
  if the downlink control channel schedules a downlink data channel in the first subframe, receiving, by the UE, the downlink data channel, and skipping sending, by the UE, the first uplink signal on the first part of symbols in the first subframe; or
  if the downlink control channel schedules a downlink data channel in the first subframe, receiving, by the UE, the downlink data channel on a third part of symbols in the first subframe, and sending, by the UE, the first uplink signal on the first part of symbols in the first subframe, wherein the first part of symbols and the third part of symbols do not overlap.

9. An information transmission method, comprising:
  determining, by a base station, a first subframe;
  configuring, by the base station, a user equipment (UE) to send a first uplink signal in the first subframe;
  determining, by the base station, whether the first uplink signal is a first type of uplink signal, wherein the first type of uplink signal occupies a first part of symbols of the first subframe, and the number of symbols comprised in the first part of symbols is less than the number of symbols comprised in the first subframe; and
  if the first uplink signal is the first type of uplink signal, sending, by the base station, a downlink control channel to the UE on a second part of symbols in the first subframe, wherein the first part of symbols and the second part of symbols do not overlap in time domain.

10. The method according to claim 9, wherein the first type of uplink signal comprises at least one of a sounding reference signal (SRS), uplink acknowledgement/negative acknowledgement (ACK/NACK) information, an uplink demodulation reference signal, an uplink data channel, channel state information, a scheduling request indicator, and random access information.

11. The method according to claim 9, wherein:
  the first part of symbols and the second part of symbols in the first subframe are on one time division duplex (TDD) carrier, or
  the first part of symbols in the first subframe is on a first carrier, the second part of symbols in the first subframe is on a second carrier, and uplink/downlink subframe configurations are different on the first carrier and the second carrier; and the UE is a half-duplex UE.

12. The method according to claim 9, wherein the first subframe on the first carrier or the second carrier is a TDD special subframe.

13. The method according to claim 9, wherein:
  the first part of symbols is a symbol, a timeslot, or an uplink pilot timeslot (UpPTS) region in the first subframe, and/or
  the second part of symbols is a symbol, a timeslot, a downlink pilot timeslot (DwPTS) region, or a conventional downlink control channel region in the first subframe.

14. A user equipment (UE), comprising:
  a determining module, configured to determine a first subframe for the UE;
  a judging module, configured to determine whether a first uplink signal is a first type of uplink signal, wherein the first type of uplink signal occupies a first part of symbols of the first subframe, and the number of symbols comprised in the first part of symbols is less than the number of symbols comprised in the first subframe; and
  a detecting module, configured to: when the first uplink signal is the first type of uplink signal, detect a downlink control channel on a second part of symbols in the first subframe, wherein the first part of symbols and the second part of symbols do not overlap in time domain.

15. The UE according to claim 14, further comprising:
  the first type of uplink signal comprises at least one of a sounding reference signal (SRS), uplink acknowledgement/negative acknowledgement (ACK/NACK) information, an uplink demodulation reference signal, an uplink data channel, channel state information, a scheduling request indicator, and random access information.

16. The UE according to claim 14, wherein:
  the first part of symbols and the second part of symbols in the first subframe are on one time division duplex (TDD) carrier, or
  the first part of symbols in the first subframe is on a first carrier, the second part of symbols in the first subframe is on a second carrier, and uplink/downlink subframe configurations are different on the first carrier and the second carrier; and the UE is a half-duplex UE.

17. The UE according to claim 14, wherein the first subframe on the first carrier or the second carrier is a TDD special subframe.

18. The UE according to claim 14, wherein the UE is configured to send the first uplink signal in the first subframe, and the UE comprises:
  a sending module, configured to:
    when the UE is configured by a base station by using an uplink scheduling grant sent by the base station at a point in time prior to the first subframe, send an uplink data channel on the first part of symbols in the first subframe;
    when the UE is configured by the base station by using a physical downlink control channel and/or downlink data channel sent by the base station at a point in time prior to the first subframe, send uplink acknowledgement/negative acknowledgement (ACK/NACK) information on the first part of symbols in the first subframe; or
    when the UE is configured by the base station by using radio resource control (RRC) signaling, a physical downlink control channel, or broadcast signaling that are sent by the base station at a point in time prior to the first subframe, send at least one of a sounding reference signal (SRS), an uplink demodulation reference signal, channel state information, a scheduling request indicator, and random access information on the first part of symbols in the first subframe.

19. The UE according to claim 14, wherein the physical downlink control channel comprises at least one of a physical downlink control channel (PDCCH), an enhanced physical downlink control channel (EPDCCH), a downlink acknowledgement/negative acknowledgement (ACK/NACK) channel, an enhanced downlink ACK/NACK channel, and a physical control format indicator channel (PCFICH).

20. The UE according to claim 14, wherein:
the first part of symbols is a symbol, a timeslot, or an uplink pilot timeslot (UpPTS) region in the first subframe, and/or
the second part of symbols is a symbol, a timeslot, a downlink pilot timeslot (DwPTS) region, or a conventional downlink control channel region in the first subframe.

21. The UE according to claim 14, further comprising:
a receiving module, configured to: if the physical downlink control channel schedules a downlink data channel in the first subframe, receive the downlink data channel, and a sending module, configured to determine that the UE skips sending the first uplink signal on the first part of symbols in the first subframe; or
a receiving module, configured to: if the physical downlink control channel schedules a downlink data channel in the first subframe, receive the downlink data channel on a third part of symbols in the first subframe, and a sending module, configured to send the first uplink signal on the first part of symbols in the first subframe, wherein the first part of symbols and the third part of symbols do not overlap.

22. A base station, comprising:
a determining module, configured to determine a first subframe for the base station;
a judging module, configured to determine whether a first uplink signal is a first type of uplink signal, wherein the first type of uplink signal occupies a first part of symbols of the first subframe, and the number of symbols comprised in the first part of symbols is less than the number of symbols comprised in the first subframe; and
a sending module, configured to: when the first uplink signal is the first type of uplink signal, send a downlink control channel to a UE on a second part of symbols in the first subframe, wherein the first part of symbols and the second part of symbols do not overlap in time domain.

23. The base station according to claim 22, wherein the first type of uplink signal comprises at least one of a sounding reference signal (SRS), uplink acknowledgement/negative acknowledgement (ACK/NACK) information, an uplink demodulation reference signal, an uplink data channel, channel state information, a scheduling request indicator, and random access information.

24. The base station according to claim 22, wherein:
the first part of symbols and the second part of symbols in the first subframe are on one time division duplex (TDD) carrier, or
the first part of symbols in the first subframe is on a first carrier, the second part of symbols in the first subframe is on a second carrier, and uplink/downlink subframe configurations are different on the first carrier and the second carrier; and the UE is a half-duplex UE.

25. The base station according to claim 22, wherein the first subframe on the first carrier or the second carrier is a TDD special subframe.

26. The base station according to claim 22, wherein the base station configures the UE to send the first uplink signal in the first subframe, and the base station further comprises:
a configuring module, configured to:
configure, by using an uplink scheduling grant sent by the base station at a point in time prior to the first subframe, the UE to send an uplink data channel on the first part of symbols in the first subframe; and
configure, by using a physical downlink control channel and/or downlink data channel sent by the base station at a point in time prior to the first subframe, the UE to send uplink acknowledgement/negative acknowledgement (ACK/NACK) information on the first part of symbols in the first subframe; or
configure, by using radio resource control (RRC) signaling, a physical downlink control channel, or broadcast signaling that are sent by the base station at a point in time prior to the first subframe, the UE to send at least one of a sounding reference signal (SRS), an uplink demodulation reference signal, channel state information, a scheduling request indicator, and random access information on the first part of symbols in the first subframe.

27. The base station according to claim 22, wherein the base station sends to the UE a physical downlink control channel on a second part of symbols in the first subframe, and the physical downlink control channel comprises at least one of a physical downlink control channel (PDCCH), an enhanced physical downlink control channel (EPDCCH), a downlink acknowledgement/negative acknowledgement (ACK/NACK) channel, an enhanced downlink ACK/NACK channel, and a physical control format indicator channel (PCFICH).

28. The base station according to claim 22, wherein:
the first part of symbols is a symbol, a timeslot, or an uplink pilot timeslot (UpPTS) region in the first subframe, and/or
the second part of symbols is a symbol, a timeslot, a downlink pilot timeslot (DwPTS) region, or a conventional downlink control channel region in the first subframe.

* * * * *